July 20, 1965
J. E. GUTRIDGE ETAL
3,195,743
CONTAINER TRANSFER DEVICE
Original Filed Feb. 16, 1961
8 Sheets-Sheet 1
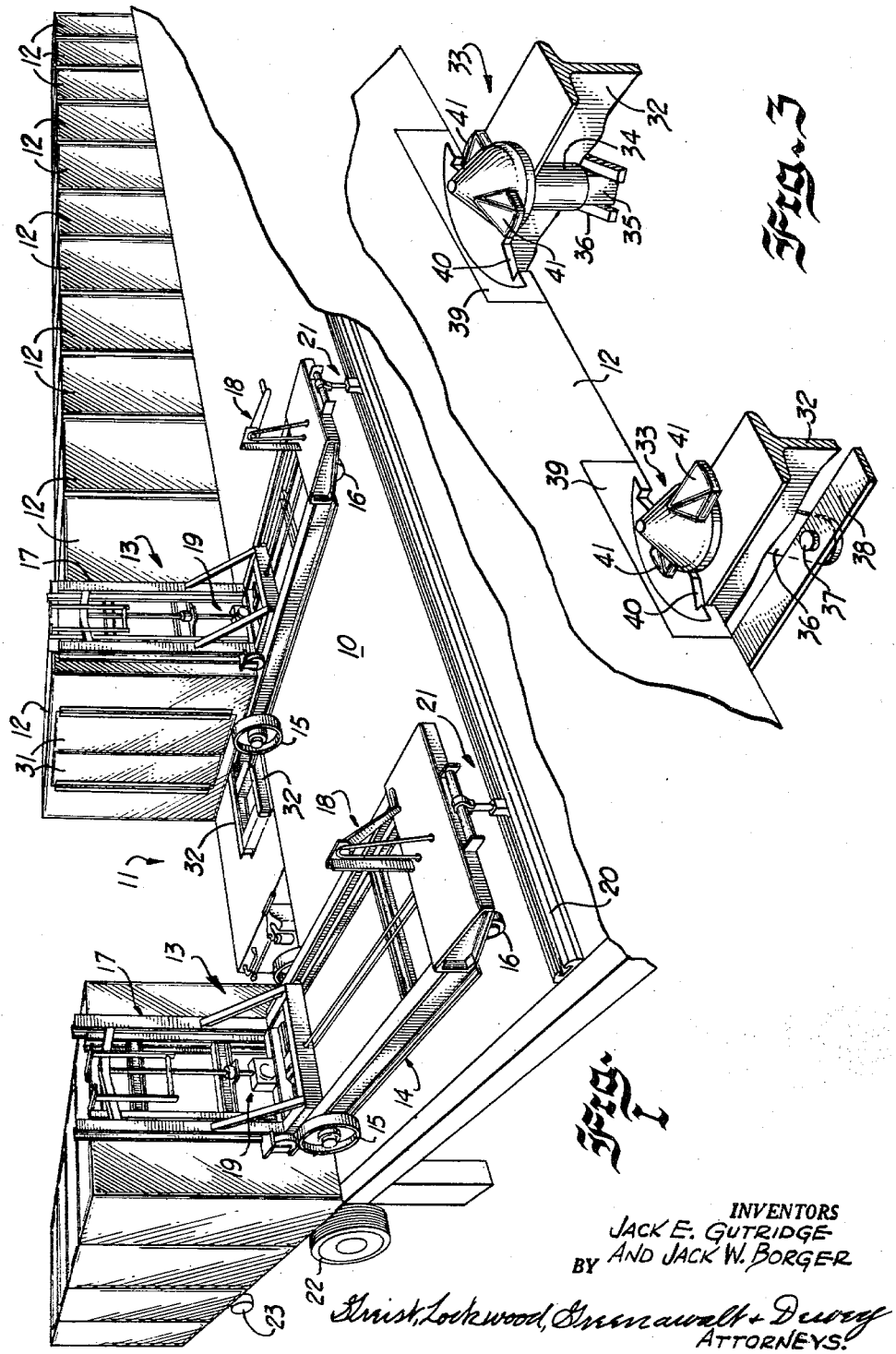
INVENTORS
JACK E. GUTRIDGE
AND JACK W. BORGER
BY
*Grist, Lockwood, Greenawalt & Dewey*
ATTORNEYS

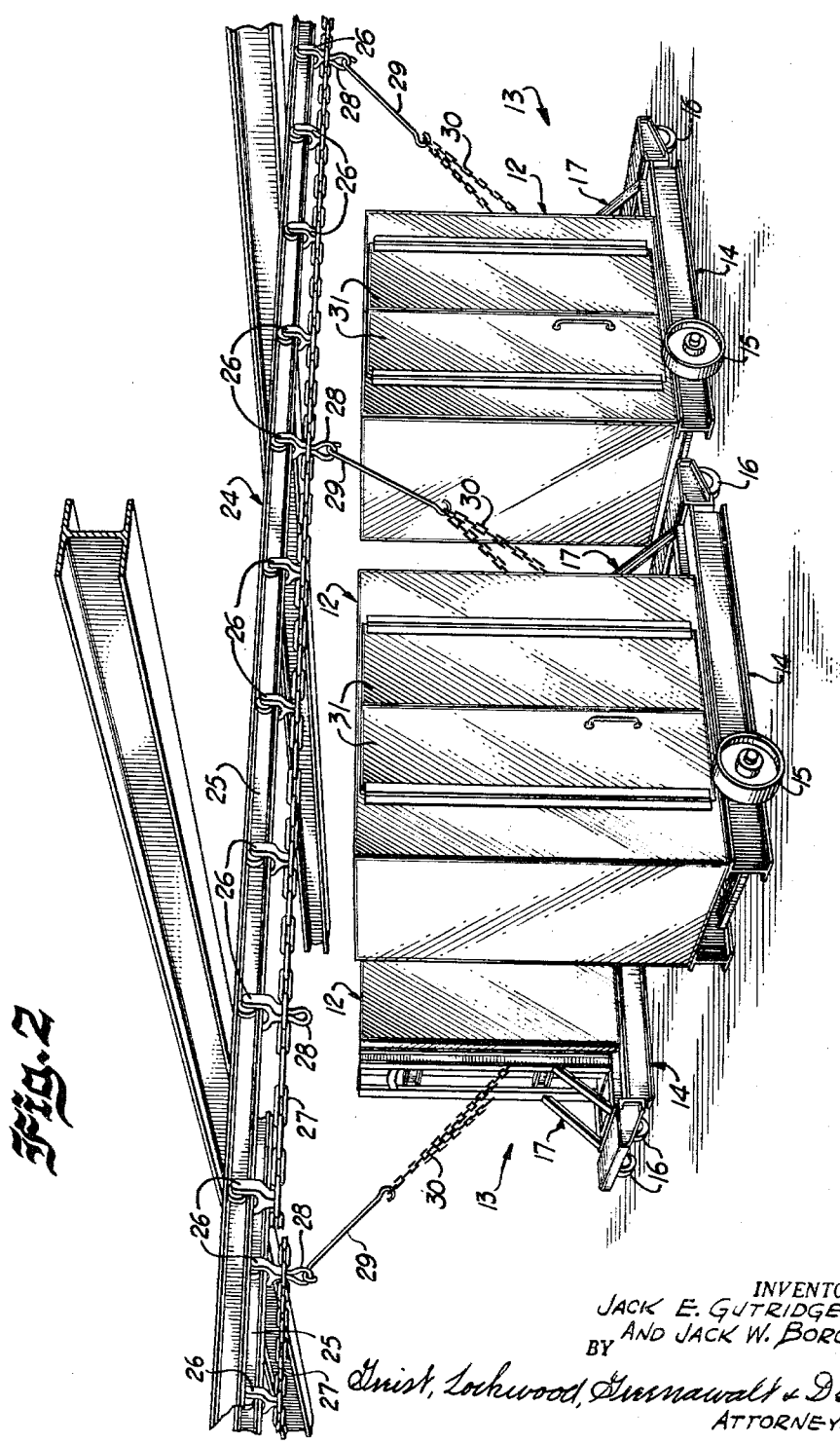

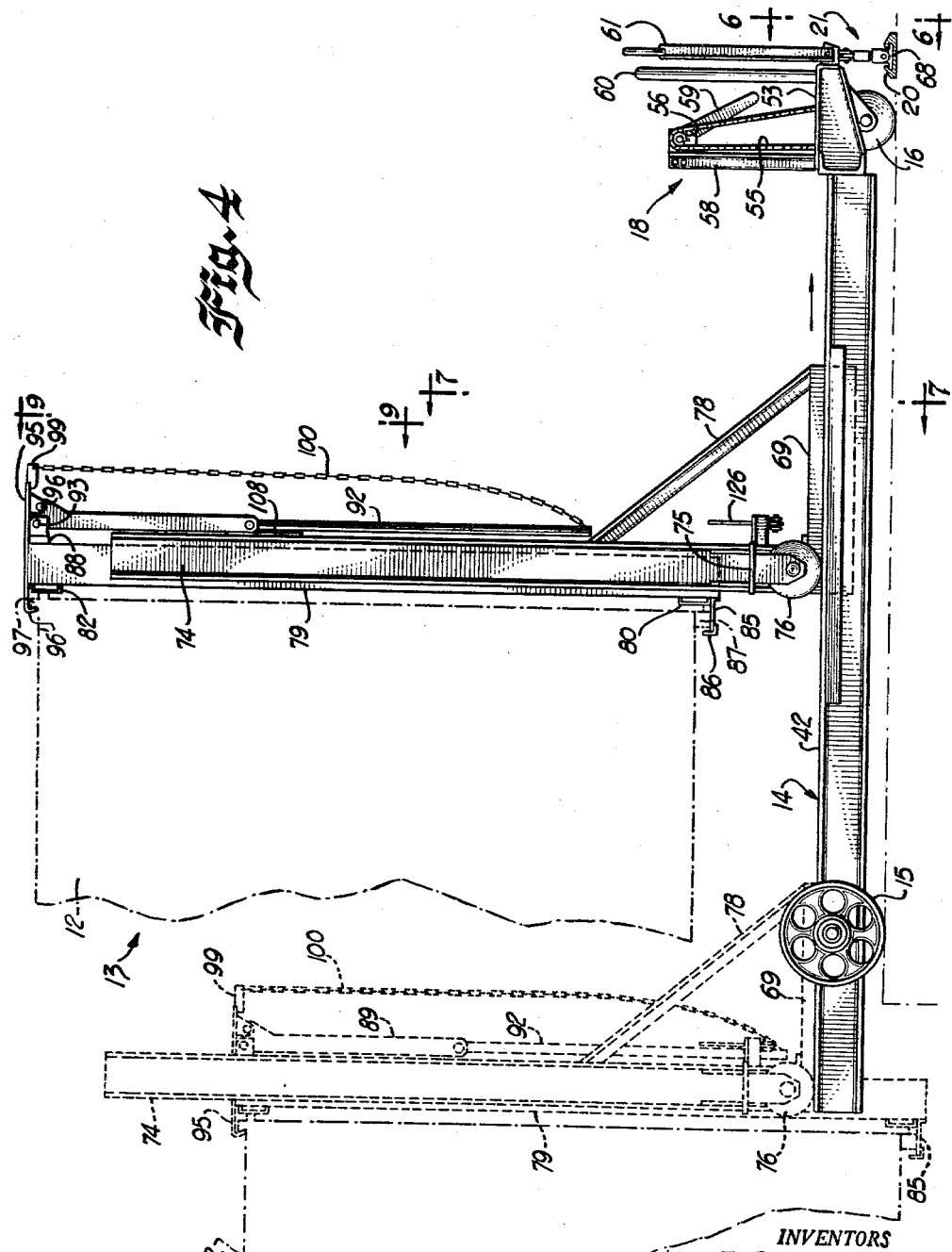

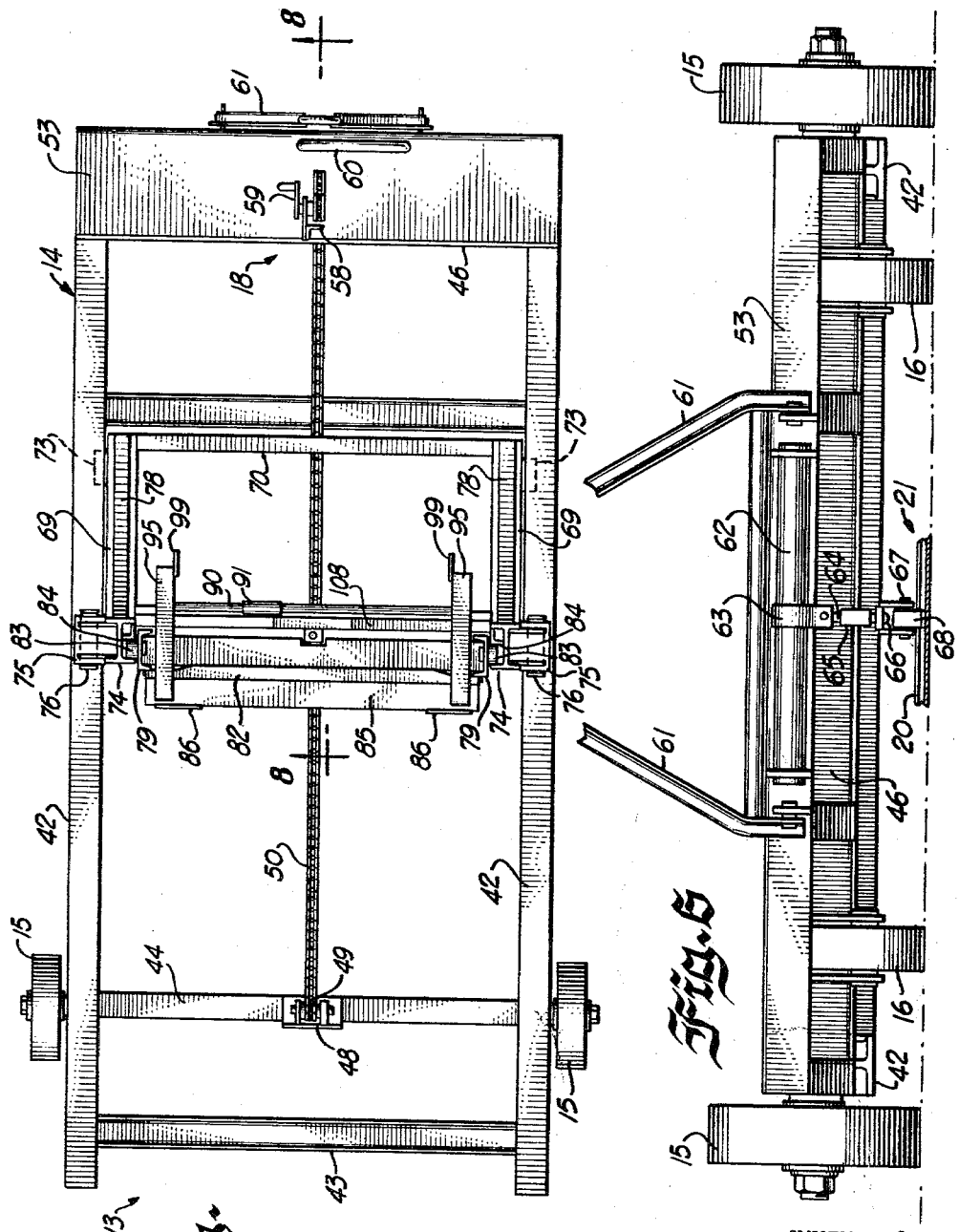

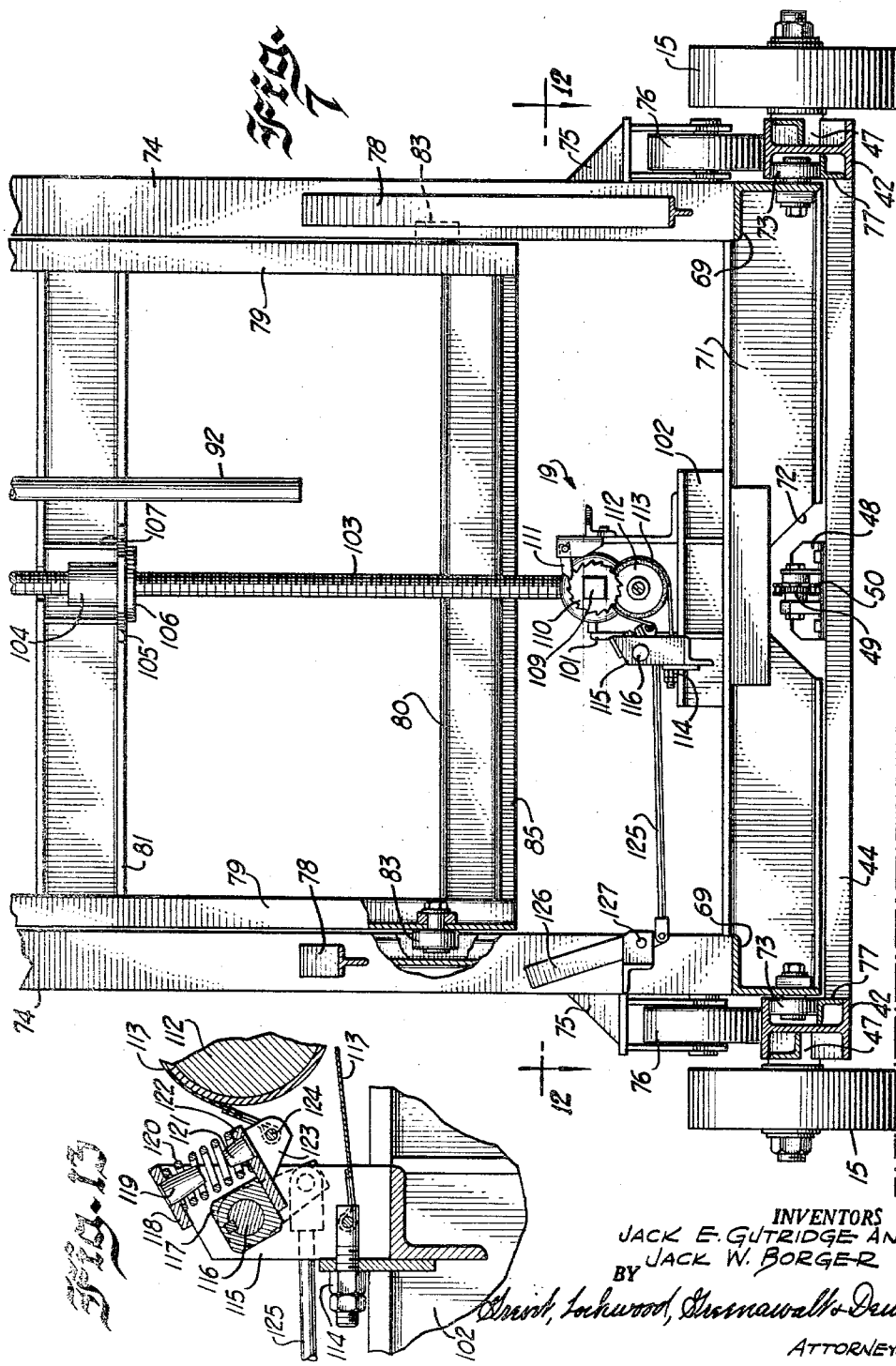

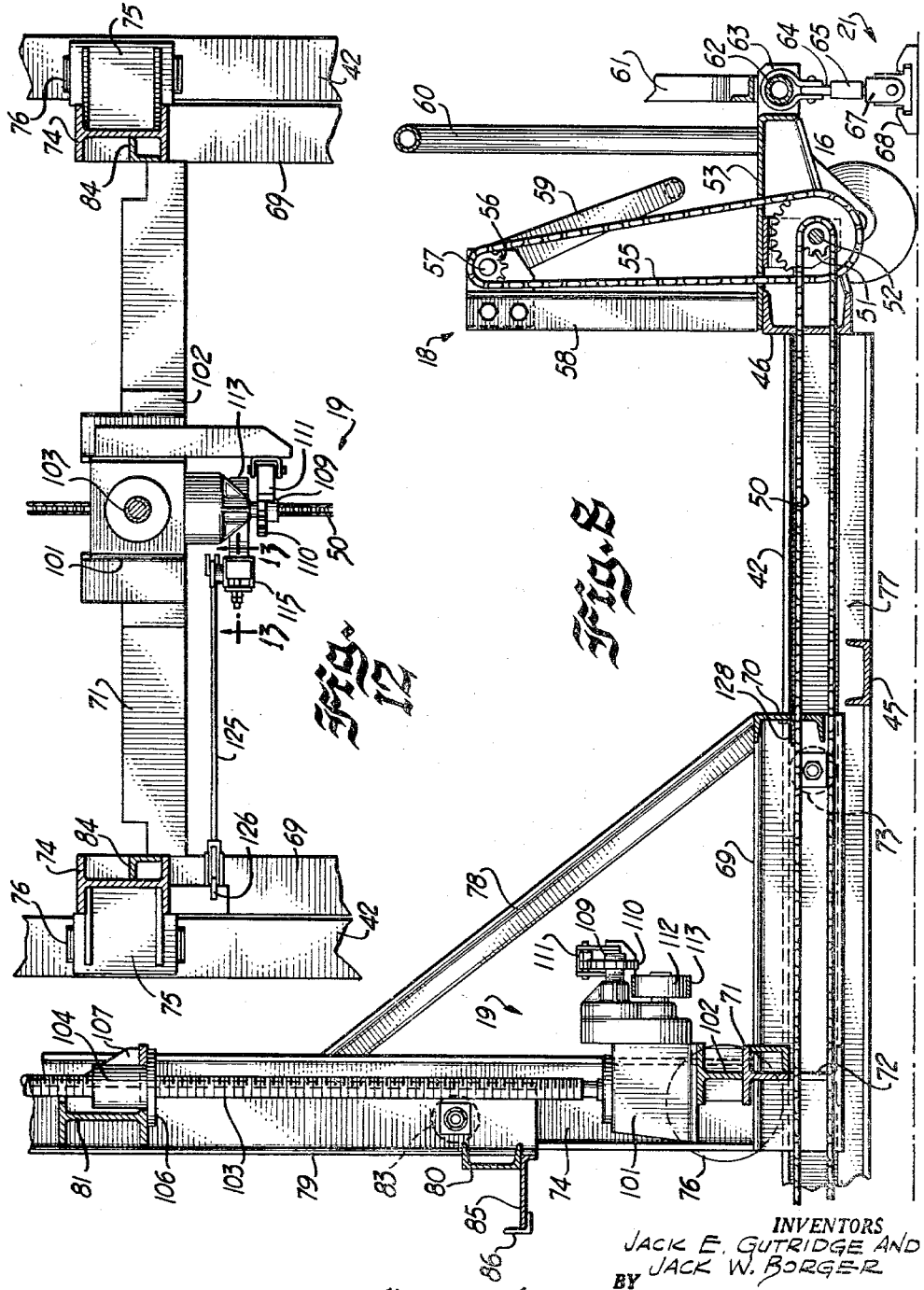

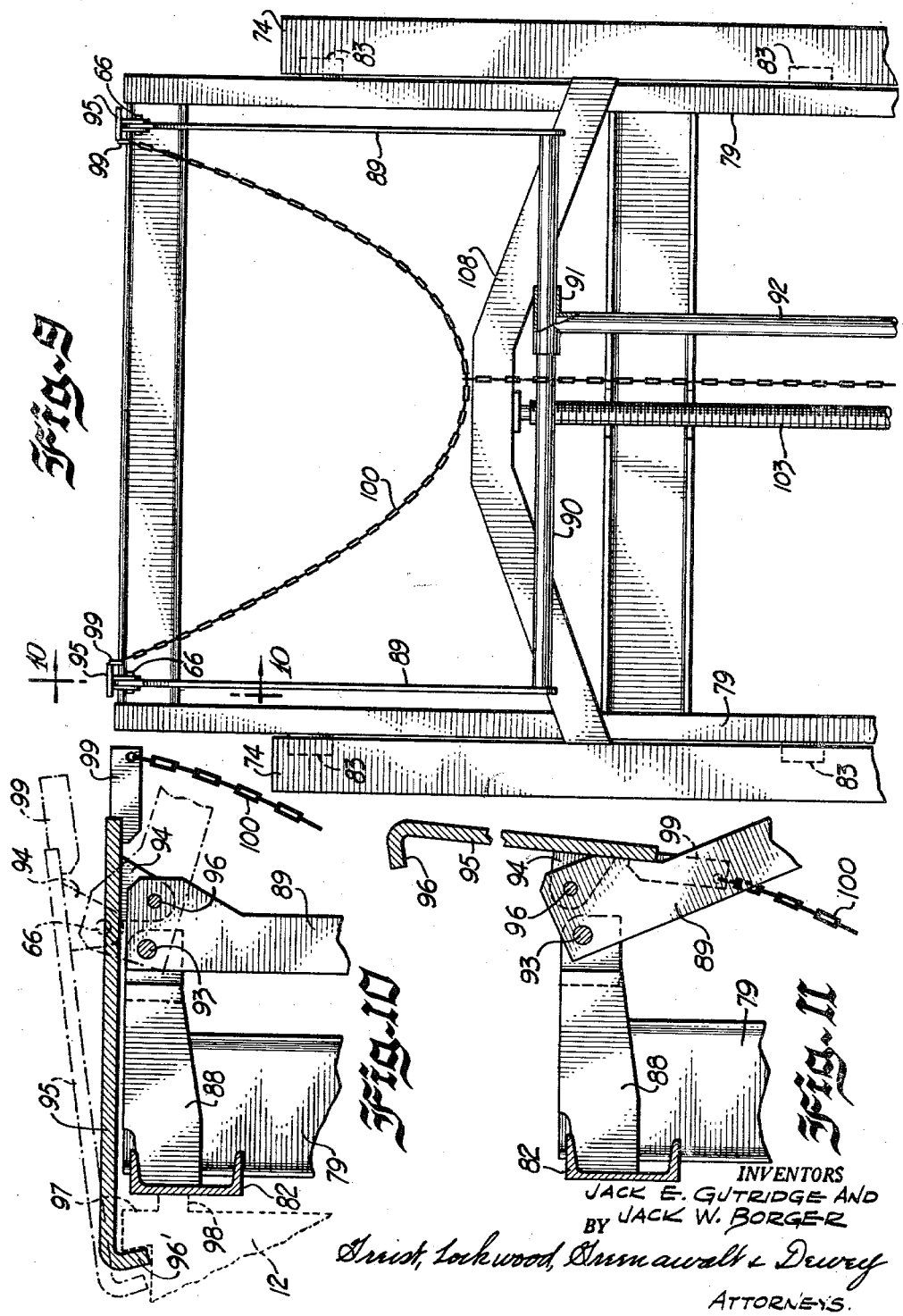

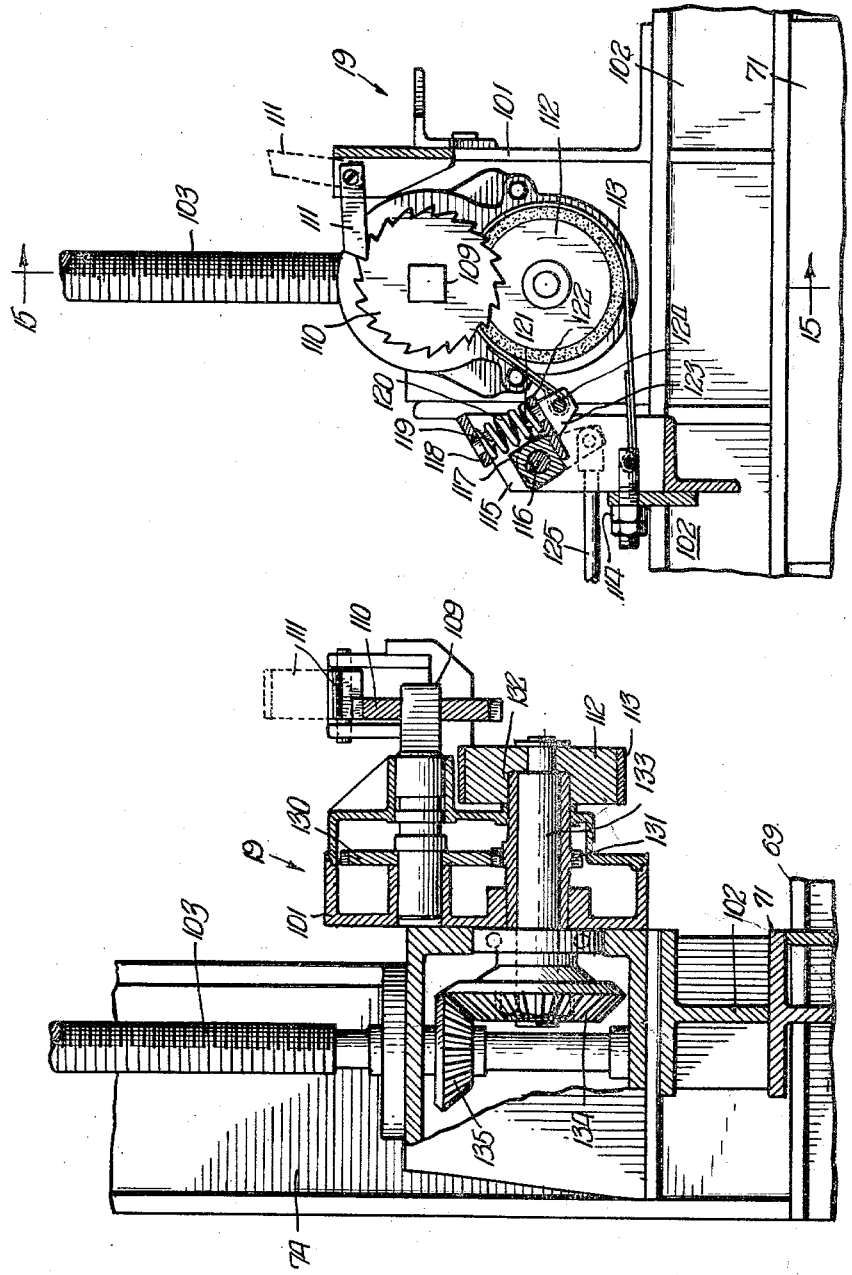

United States Patent Office 3,195,743
Patented July 20, 1965

3,195,743
CONTAINER TRANSFER DEVICE
Jack E. Gutridge, Dyer, Ind., and Jack W. Borger, Calumet City, Ill., assignors to Pullman Incorporated, Chicago, Ill., a corporation of Delaware
Original application Feb. 16, 1961, Ser. No. 89,859, now Patent No. 3,094,226, dated June 18, 1963. Divided and this application July 26, 1962, Ser. No. 212,549
3 Claims. (Cl. 214—75)

The invention relates to a special container transfer device for use as a part of the container transfer system, the device being specially constructed for efficient and fast handling of containers during loading and unloading thereof. This application is a division of our copending application, Serial No. 89,859, filed February 16, 1961 now Patent No. 3,094,226.

Piggyback lading operations have expanded greatly within the last few years. The primary reason for the growing success of piggyback lading operations resides in the elimination of substantial time-consuming labor involved in the transfer of individual pieces of freight to and from short haul trucks and long haul railroad freight cars. The original basic concept of piggyback operation evolved with the transportation of truck trailer units either with or without the truck trailer chassis. In this regard the trailer in its loaded condition is loaded onto a suitably designed flat car or the like and staked thereto for transporting purposes. At this designation, the trailer is merely unloaded from the car by a truck tractor and contents thereof, untouched since initial loading in the trailer body, are delivered to the destination and there unloaded for the first time.

With the advantages of piggyback operations becoming apparent, many different types of freight containers have been proposed for use in piggyback hauling operations. These containers are designed for transferring to and from a truck trailer chassis and a railroad flat car. In line with the concept of the present invention, it has been realized that piggyback operations can be used with any type of freight even including railway express freight which has been to date handled on a piecemeal basis and hauled in special express agency closed cars. The present invention deals with the use of a suitable less expensive open deck flat car adapted for piggyback operation with a plurality of freight containers. These containers are of a size which may be readily handled in passenger depots and are designed for loading with freight parcels of the type normally handled by railway express shippers. In this respect, the piggyback container car replaces the standard railway express car in the make-up of a passenger train as well as express freight trains. The cars are designed for loading and unloading in freight yards and passenger depots.

An object of the invention is to provide a new and improved container transfer device for use in loading and unloading containers relative to a piggyback railway car, the device comprising uniquely, operation means providing for efficient handling of a container thereon during loading and unloading of the container as well as during transfer thereof in freight yard and passenger depot facilities.

Still another object is to provide a new and improved transfer device of the type described above which is of uncomplicated, low maintenance construction and which includes a base frame on which a container engaging frame is movable into and out of end loading and unloading position and into and out of centrally located container transfer position.

Other objects not specifically set forth will become apparent from the following detailed description of the invention made in conjunction with the accompanying drawings wherein:

FIG. 1 is a diagrammatic illustration of a portion of the container transfer system of the present invention;

FIG. 2 is a diagrammatic illustration of still another portion of the container transfer system of the invention;

FIG. 3 is a fragmentary perspective of container attachment means forming a part of a piggyback car structure;

FIG. 4 is a side elevation of the container transfer device of the invention illustrating different operative positions of certain portions thereof;

FIG. 5 is a top plan view of the device of FIG. 4;

FIG. 6 is an enlarged fragmentary front end elevation of the device as viewed generally along line 6—6 in FIG. 4;

FIG. 7 is an enlarged fragmentary transverse section of the device taken generally along line 7—7 in FIG. 4;

FIG. 8 is an enlarged fragmentary longitudinal section of the device taken generally along line 8—8 in FIG. 5;

FIG. 9 is a transverse fragmentary elevation of a portion of the device as viewed along line 9—9 in FIG. 4;

FIG. 10 is an enlarged fragmentary sectional view taken generally along line 10—10 in FIG. 9;

FIG. 11 is a view similar to FIG. 10 illustrating operational use of the elements shown therein;

FIG. 12 is a fragmentary, partly sectioned view of a portion of the operating means of the device, this view being taken generally along line 12—12 in FIG. 7;

FIG. 13 is an enlarged fragmentary section of a subassembly of the operating mechanism of the device taken generally along line 13—13 in FIG. 12;

FIG. 14 is an enlarged fragmentary elevation of the operating means for a container engaging assembly forming a part of the device; and FIG. 15 is a vertical section of the operating means of FIGURE 14 as viewed generally along line 15—15 therein.

The container transfer system of FIG. 1 includes a loading platform or dock 10 of a type which exists in freight yards and passenger depots. The dock illustrated is formed from wooden planks but it will be understood that concrete docks or the like may be used. One side of the dock extends along a railroad track (not shown) which provides for the movement of railroad cars into association with the dock for container transfer operations. The front end portion of an open deck flat car 11 is shown in FIG. 1, this car being designed for piggyback operation of a plurality of freight containers 12. The containers 12 may be of any desired size which should be limited to permit ready transfer and handling thereof in existing shipping room facilities. By way of example, each container 12 may be approximately 8 feet in height and 5 feet in width with the depth of the container being controlled by the width of the flat car 11 designed for hauling the same. Most generally the dock 10 will be raised relative to the container supporting surfaces of the car 11 as such cars are now being designed with low height providing for low center of gravity operation. The adjacent sides of the dock 10 and car 11 will be slightly spaced for operation of a container transfer device 13 therebetween.

The container transfer device 13 generally comprises a horizontal support platform 14 supported at its container engaging end by a pair of wheels 15 and at its opposite end by a pair of swivel casters 16. The support platform has mounted thereon a vertically extending and extensible container engaging assembly 17 which is movable longitudinally along the support platform 14. The support platform is provided with operating means 18 engaged with the container engaging assembly 17 to move the same and a container attached thereto longitudinally of the support platform. The container engaging assembly 17 is provided with operating means 19 which function to vertically adjust the assembly for the lifting and lowering of a container engaged thereby. The details of construction of the container transfer device 13 will be subsequently described.

The dock 10 longitudinally thereof is provided with a continuous tie-down track member 20 which may be formed from an upwardly opening, generally C-shaped channel member or a pair of juxtaposed inwardly opening channel members as shown in FIG. 1. The track 20 may be embedded in the dock 10 or may be suitably attached to the surface thereof. A plurality of container transfer device stake means or tie-down means 21 are locked in the track 20 against vertical displacement therefrom but are slidably movable longitudinally therealong. Each tie-down means 21 is adapted for releasable attachment to the innermost end of a container transfer device 13 to stabilize the same during opposite end container loading and unloading operation thereof. While the dock 10 is illustrated as being of substantial width, it will be understood that by reason of the special design of the container transfer device 13, the same is adapted for operation on existing freight docks of less width. In other words, the support platform 14 of each device 13 is of a length which provides for accommodation of a container 12 thereover and yet permitting transverse placement thereof on existing loading docks in freight yards and passenger depots.

The dock 10 as shown in FIG. 1 is also adapted for use in loading and unloading containers 12 from a trailer chassis which is evidenced in FIG. 1 by a rear wheel truck assembly 22 and the front retractable dolley wheel assembly 23. The trailer chassis may be arranged relative to the dock 10 at any desired location for container transfer thereto. Thus as shown in FIG. 1, containers 12 may be readily transferred by use of a device 13 between the railway car 11 and the trailer chassis without the necessity of disturbing the contents therein. In this regard the contents are completely protected during transfer as well as during shipping and the system is fully operative under all weather conditions.

FIG. 2 illustrates containers 12 being centrally supported on container transfer devices 13 which are being moved along a floor surface by means of attachment to a power driven, overhead conveyor unit 24. The unit illustrated comprises channel beams 25 which parallel one another and which have attached thereto a plurality of chain supports 26 which are roller mounted on the beams. An endless chain 27 is carried by the supports 26 and suitable hook receiving eye members 28 depend therefrom. A hook arm 29 engages an eye 28 and has attached at the opposite end thereof a chain 30 which is suitably attached to the container engaging assembly 17 of a transfer device 13. The conveyor 24 functions to automatically deliver the containers 12 mounted on the transfer devices 13 to and from a shipping room or the like and the conveyor preferably extends over the dock 10. Following loading of a container on a transfer device 13, the tie-down means is disconnected and the device 13 may be readily turned by reasons of the caster wheels 16 for movement longitudinally along the dock 10. The transfer device 13 is suitably attached to the overhead conveyor 24 in the manner described and containers are delivered to any point in the freight handling facilities desired. In this regard, the system illustrated may be utilized in transferring containers to and from the railway car 11 and trailer chassis.

The containers 12 may be of any suitable design such as including hinged door members 31 as shown in FIG. 2. FIG. 3 taken in conjunction with FIG. 1 illustrates one suitable manner of detachably mounting the containers 12 on the railway car 11. Piggyback railway cars have recently been provided with a cushioned rack assembly on which containers are mounted or to which trailers and other types of lading are attached. Generally, the rack assembly includes a pair of transversely spaced I-beams 32 which are interconnected and which are slidably mounted on the top center surface of the car 11. Rubber or hydraulic cushioning means interconnect the rack assembly with the car body and the rack assembly will travel relative to the car body when the car is subjected to operational shocks such as in buff and draft. In this manner the lading attached to the rack assembly is isolated from the operational shocks which are absorbed in the cushioned travel of the rack assembly and the lading.

FIG. 3 illustrates the spaced rails 32 of the rack assembly as including a pair of cone locking members 33 which are suitably journaled in the top flange portion of a rail in upwardly projecting relation. Each cone member is mounted for pivoting about its main axis and includes a depending shank portion 34 which at the bottom thereof is formed with a reduced flat sided portion 35. A bifurcated lever 36 extends through a suitable opening in the vertical center portion of the rail and the bifurcated end thereof is received about the flat sided bottom portion 35 of a cone. The outer end of the lever 36 is pivotally connected by a fastener means 37 to an operating lever 38 which extends along the outer surface of the rail. The operating lever 38 is longitudinally continuous and has pivotally attached thereto a number of levers 36 engaged with pivotal cone assemblies 33. Thus the rack assemby is provided with a plurality of pairs of locking cone assemblies throughout its entire length with a pair acting on each bottom side margin of a container to lock the same to the car 11.

Along the side of each container 12 is a pair of locking groove inserts 39 each of which is formed with a locking tongue portion 40. Each locking cone includes a pair of oppositely directed locking lugs 41 which project outwardly from the cone and are adapted to be received in overlapping engagement with the top surface of a locking tongue 40. The cone assembly 33 shown in the left-hand portion of FIG. 3 is in its operative container locking position. It will be appreciated that the forwardly projecting locking lug 41 is adapted to engage another container 12 which is placed immediately adjacent the container illustrated in resting engagement on the top surfaces of the rails 32. The cone assembly 33 shown in the right-hand portion of FIG. 3 is in its inoperative position with the locking lugs 41 thereof out of engagement with locking tongues. In this condition the adjacent containers 12 may be readily removed from the car 11. All of the locking cone assemblies may be operated simultaneously by suitable operation of the lever 38 carried on each outer surface portion of a rail 32.

FIGS. 4 and 5 illustrate the container transfer device or bogie 13 as being formed from a pair of horizontal side beams 42 which are interconnected by transverse beams 43, 44, 45 and 46 cooperating therebetween to define the support platform 14. The transverse beam 44 is aligned with platform supporting wheels 15 which are mounted on suitable stub shafts journaled in housings 47 (FIG. 7) which are suitably attached along the outer recessed surface portions of the beams 42, these beams being in the form of I-beams. The transverse beam 43 is located inwardly of the adjacent ends of the longitudinal side beams 42 to permit operation of the container engaging assembly 17 over the side of a dock and below the support platform 14 as shown in broken lines in FIG. 4.

The transverse beam 44 as best shown in FIGS. 5 and 7 has centrally mounted thereon a bracket member 48 supporting an idler sprocket assembly 49 which is engaged with an endless chain 50. The chain extends centrally of the side beams 42 longitudinally of the support platform 14 into engagement with a sprocket 51 (see FIG. 8) which is mounted on a rotatable shaft 52. The shaft is suitably mounted in an end housing portion 53 which projects beyond the adjacent ends of the side beams 42 and is suitably attached to the transverse beam 46. Also mounted on the shaft 52 is a larger drive sprocket 54 which in turn is connected by an endless chain 55 to a smaller sprocket 56. This sprocket is mounted on a drive shaft 57 which is suitably carried by an upstanding support member 58, all of these elements constituting a part of the container engaging assembly drive means 18. The shaft 57 may be an integral part of a hand crank 59 or the hand crank 59 may be readily detachable from the shaft 57. The chain 50 extends through suitable openings in the transverse beam 46 and the chain 55 extends through suitable openings in the top surface portion of the end housing 53.

The end housing 53 suitably mounts therein the swivel casters 16. The housing also includes an upstanding inverted U-shaped pipe 60 for grasping by an operator during movement of the bogie 13. As best shown in FIGS. 4 and 6, the front end of the housing 53 carries a pivotally mounted drawbar 61 which is used for attachment of the bogie to a truck or the like for movement thereof. A fixed rod 62 extends along the center portion of the front face of the end housing 53 and has attached thereto a metallic clevis-type band 63 which forms a part of the tie-down means 21. The band is attached to a depending threaded eyebolt 64 which is received within a sleeve nut 65. This nut has fixed thereto a rotatable butt head rivet 66 which is held captive except for rotation in a pivotally mounted clevis member 67. This member is pin mounted to a base plate 68 which in turn is received in the tie-down track 20 previously described. Rotation of the sleeve nut 65 provides for tie-down attachment or disengagement of the end of the bogie 13 in connection with opposite end loading and unloading operations. While the use of the tie-down means 21 of the type described is preferred in the special system of the invention, it will be understood that any other suitable container weight counterbalancing arrangement may form a part of the bogie to permit container transfer over the operating end thereof.

As best shown in FIGS. 4, 5 and 7, the container engaging assembly 17 at the base thereof is provided with a pair of horizontal, inverted L-shaped beams 69. The outer ends of the beams 69 are interconnected by a transverse frame member 70 (FIG. 5) and the inner ends of the beams 69 are suitably attached to a transverse beam 71 (FIG. 7) having a flat top surface on which the container engaging drive means 19 is mounted. As best shown in FIG. 7, the bottom center portion of the transverse beam 71 is provided with an inverted V-like groove 72 to provide clearance relative to the chain 50 during longitudinal operation of the container engaging assembly 17 along the support platform 14. The longitudinal beams 69 are located just inwardly of the side frame members 42 of the support platform and the outer surfaces thereof have suitably mounted thereon a pair of small rollers 73. These rollers as shown in FIGS. 5 and 8 are located adjacent the outermost ends of the beams 69.

Vertically upstanding side frame members 74 are mounted on the frame members 69 and 71 and are fixed relative thereto. The outer bottom surface portions of these frame members include outwardly projecting roller housings 75 which suitably mount therein rollers 76 in engagement with the flat top surfaces of the side frame members 42 of the support platform 14. Thus the entire container engaging assembly 17 is vertically supported by the rollers 76 and stabilized by the rollers 73 for movement longitudinally along the support platform 14. The inner groove portions of the side frame members 42 of the support platform 14 in which the stabilizing rollers 73 are received are also provided with bottom roller track members 77 which are of inverted L-shape and are suitably secured therein. The upstanding side frame members 74 of the container engaging assembly 17 are reinforced by diagonal supports 78 which extend rearwardly into engagement with the longitudinal beams 69 and the outermost transverse frame member 70.

As best shown in FIGS. 4, 5, 7 and 9, the upstanding side frame members 74 are in the form of I-beams and receive therebetween a vertically movable container engaging frame which is formed from side members 79 and transverse frame members 80, 81 and 82. The outer surfaces of the side members 79 have suitably mounted thereon a plurality of rollers 83 which are received in the adjacent inwardly opening side grooves of the vertical frame members 74 as best shown in FIGS. 5 and 7. A generally L-shaped track member 84 is mounted in each side groove of a frame member 74 and the rollers 83 operate therealong during vertical operation of the container engaging frame. The lower end of the transverse member 80 as best shown in FIG. 8 has fixed thereto an outwardly extending transverse container supporting ledge 85 which includes at least a pair of L-shaped upstanding edge members 86 designed to project upwardly behind a bottom surface rib-like projection 87 formed on the container 12 as shown in broken lines in FIG. 4.

FIGS. 9–11 illustrate a container top locking arrangement which is carried on the movable frame portion of the container engaging assembly 17. The top transverse frame member 82 of the movable frame portion has mounted thereon a pair of transversely spaced, rearwardly projecting plates 88 which at their rearmost ends have pivotally attached thereto depending lever plates 89. These plates extend downwardly and are interconected at their bottom ends by a transverse rod 90 which in turn receives thereabout a slidable sleeve portion 91 of a depending operating rod 92. The plates 89 are pivotally attached to the plates 88 by pins 93. The lever plates 89 are provided with rearwardly projecting portions adjacent their pin connections with the fixed plates 88 and have pivotally attached thereto in these portions depending flange members 94 of hook members 95. The pivotal attachment of the hook members is provided by pins 96 which are located rearwardly of the pins 93 and in this respect are offset from the pivot points of the lever plates 89.

The hook members are in the form of flat strips which at their outermost operative ends are formed with hook portions 96 adapted to engage the rear face of a top edge rib-like projection 97 of a container 12 shown in broken lines in FIG. 10. The top front face portion of a container 12 is preferably provided with a projecting rib member 98 designed for abutment with the transverse frame member 82 to hold the container in spaced relation therefrom when hooked thereto by a hook member 95 for stabilized operation thereof. Each hook member 95 at the rear end thereof which projects beyond the pivot flange member 94 is provided with a plate portion 99 having attached thereto a depending chain member 100. The chain member 100 as best shown in FIG. 9 has Y-portions extending into connection with the hook members 95 and combining in a single depending portion which may be readily grasped by the operator for simultaneous pivoting of the hook members in a manner to be described.

Operation of the hook members 95 for engagement with the top projection 97 of a container 12 involves the outward and upward pivoting of the lever plates 89 by means of the handle means 92 to pivot the pins 96 about the pins 93 in a counterclockwise direction as shown in broken lines in FIG. 10. In this position of the elements the forward hook end portion 96' of each hook member 95 is tilted downwardly as shown in FIG. 10 for ready engagement or disengagement with the top projection 97 of a container. In order to raise the hook end portion 96' over the projection 97, the chain 100 is pulled downwardly by the operator and the hook members pivot about their pins 96 to any extent desired as shown in FIG. 11. During container attachment by the hook members 95, the chain is used to raise the hook end portions 96' over the top projection 97 and the chain is then released with the hook end resting on top of the container rearwardly of the projection 97. The handle 92 is then pulled downwardly and the hook members move again into a flat horizontal position as shown in solid lines in FIG. 10 with the result that the top edge of the container 12 is firmly attached to the container engaging assembly 17. Disengagement of the container 12 is carried out by reversing the operation described and following tilting of the hook members 95 by operation of the rod 92, the chain 100 is pulled downwardly with the result that the hook members pivot into a vertical position as shown in FIG. 11. During the operations described the container supporting ledge 85 is in its operative position below the bottom surface of the container with the upstanding edges 86 thereof located behind the depending rib portion 87 of the container.

The container engaging assembly operating means 19 as illustrated in FIGS. 7, 8 and 12, includes a gear box unit 101 suitably mounted centrally on the transverse frame member 71 by an intermediate short supporting member 102. Extending upwardly from the top of the unit 101 is a rotatable jack screw 103 which has threadedly received thereon a flanged collar-type jack 104. The jack is fixed in a bottom flange portion 105 of the transverse beam 81 which interconnects the vertical members 79 of the container engaging frame. The jack 104 is provided with a bottom flange 106 which supports the vertical load of the container attaching unit as well as the load of a container attached thereto. The jack 104 further includes a projecting lug 107 which engages an opposite surface portion of the frame member 81 to provide for positive operation of the movable container engaging frame in both vertical directions. FIG. 9 illustrates the manner in which the top end of the jack screw 103 is in abutment with a bottom center surface portion of a yoke-type transverse frame member 108 extending across the container engaging frame in opposite end fixed engagement with the vertical side frames 74 previously described. The particular shape of the yoke 108 aids in maintaining proper centering of the jack screw 103 in the manner illustrated.

The jack screw 103 is operated through a suitable gearing arrangement in the gear unit 101. This arrangement includes connection with an outwardly projecting shaft 109 which is flat sided at its outermost end for suitable engagement by a power tool or hand crank. The shaft 109 carries thereon a ratchet 110 which is engaged by a pivotally mounted pawl 111 arranged to releasably hold the movable container engaging frame in a designated vertical position with a container attached thereto. Mounted below the shaft 109 is a shaft mounted brake drum 112 which is engaged by a flexible brake band 113 received thereabout. As best shown in FIGS. 7 and 12, the lowermost end of the brake band 113 is fixed by fastening means 114 within an upstanding housing portion 115 which is formed by paralleling vertical plates.

FIG. 13 illustrates the details of the end attachments of the brake band 113. The housing plates 115 mount therebetween a rotatable pin 116 which has suitably keyed thereon a clevis member 117. The upper end of the plates 115 have fixedly secured thereto a transverse outwardly projecting plate 118 which includes a downwardly projecting spring core 119 about which a coil spring 120 is received. The bottom end of the coil spring 120 is received about a core 121 which is fixedly mounted in a plate 122, this plate being fixedly secured to the clevis member 117. The plate 122 is further provided with a downwardly projecting flange 123 carrying a transversely projecting pin 124 to which the remaining end of the brake band 113 is attached. The clevis 117 has pivotally attached thereto an end member of an operating rod 125 which as best shown in FIG. 7 extends transversely to attachment with an operating lever 126 which is suitably pivotally mounted on a vertical side frame member 74 by a pin 127.

The spring 120 is under substantial compression at all times and functions to urge the plate 122 away from the fixed plate 118 and in doing so pull the attached end of the brake band 113 downwardly for tight engagement of the brake drum 112. During the compressive action of the spring 120, the clevis member 117 is urged to pivot in a counterclockwise direction with the pin 116. In this regard the operating rod 125 is urged outwardly away from the brake unit and the operating lever 126 is urged to pivot in a clockwise direction.

Specifically, as shown in FIG. 15, the operating means 19 for the jack screw 103 includes a drive gear 130 housed in the gear box unit 101 and fixed on the shaft 109 to which the power tool or hand crank (not shown) is adapted to be engaged to lift the container engaging frame through the jack screw 103. The drive gear 130 engages a gear 131 forming a part of a collar 132 suitably fixed to a shaft 133 which at one end projects outwardly from the gear box unit 101 and carries the brake drum 112, and at the other end carries a bevel gear 134 which is engaged with a gear 135 fixed to the jack screw 103. The jack screw is suitably journalled in the gear box unit 101 and extends vertically therefrom with the various shafts 109 and 133 being also suitably journalled in the gear box unit. Thus driven rotation of the shaft 109 results in driving of the shaft 133 including the brake drum 112 and a corresponding driving of the jack screw 103.

FIGS. 13 and 14 best illustrate the specific operational features of the operating means 19. In the absence of power tool application to the drive shaft 109, the coil spring 120 holds the brake band 113 tightly against the brake drum 112 with the band 113 of course holding the operating lever 126 in the position shown in FIG. 7. Thus the shaft 133 is locked by the brake arrangement and the jack screw 103 will not operate. This locking action is further aided by the operative position of the pawl 111 as shown in solid lines in FIG. 14 wherein it engages the teeth of the ratchet 110 to prevent rotation of the shaft 109 in a clockwise direction. The gearing arrangement is such that operation of the shaft 109 in a counterclockwise direction results in raising of the container engaging assembly. During such rotation the pawl 111 of course merely rides along the teeth of the ratchet 110. Furthermore, the brake drum 112 rotates in a clockwise direction and the force of rotation acts against the brake band 113 and the coil spring 120 to permit overriding of the brake friction established between the band and the drum. In this respect it will be noted that the spring 120 is angularly related to be compressed during clockwise rotation of the drum 112.

In order to lower the container engaging assembly, the shaft 109 is moved in a counterclockwise direction by suitable power means sufficiently to permit release of the pawl 111, and the pawl is then raised into the broken line position illustrated in FIG. 14 away from the ratchet 110. The power tool is removed from engagement with the shaft 109 and the brake arrangement is sufficient to hold the container engaging assembly in an elevated position. This is made possible by reason of the weight of the container engaging assembly being applied to the brake drum to urge the same to rotate in a counterclockwise direction thus placing the brake band in tension against the fixed stop or attachment 114. Movement of the operating lever 126 and the shaft 125 results in selective compression of the coil spring 120 thus relieving the tension in the band 113 and permitting controlled sliding of the brake drum in a counterclockwise direction to lower the container engaging assembly. This type of arrangement is known per se, namely, the use of a friction slip brake arrangement to control lowering of an elevated assembly. The shaft 109 of course will rotate in a clockwise direction during the lowering action.

Assuming attachment of a container 12 to the movable frame portion of the container engaging assembly 17 with the movable frame portion being in a raised condition relative to the support platform 14, the pawl 111 is lifted out of engagement with the ratchet 110 and the container is held in its elevated condition solely by the brake band 113 engaging the brake drum 112. The operator will pull the operating lever outwardly to rotate the same in a counterclockwise direction with the result that the operating rod 125 will be pushed inwardly to rotate the clevis member 117 and attached pin 116 in a counterclockwise direction. This will result in movement of the plate 122 toward the plate 118 to an extent that the spring 120 is further compressed and the adjacent end of the brake band 113 will be moved upwardly to an extent that the brake drum 112 is released for rotation. The jack screw 103 will then be free to rotate and the movable frame portion of the container engaging assembly by reason of its weight as well as the weight of the container will move downwardly. Downward movement can be terminated at any point desired by releasing the operating lever 126 under which condition the spring 120 will again expand sufficiently to apply the brake band 113 to the drum 112 to stop further rotation of the jack screw 103. The shaft 109 on which the ratchet 110 is mounted is a completely separate shaft to provide for operation of the jack screw 103 independent of the drum. In other words, the gearing arrangement in the unit 101 is such that the movable frame portion of the container engaging assembly can be raised by rotation of the shaft 109 but the brake drum will prevent reverse rotation of the jack screw 103 and downward movement of the movable frame portion. Thus in lowering the frame portion to an extent aligning it for container engagement, the brake release lever 126 must be operated and the movable frame portion by reason of its own weight will drop downwardly to the extent desired.

FIG. 4 best illustrates operational functioning of the bogie 13. Assuming unloading of a container 12 from a flat car 11 which supports the container at a level below the top surface of the dock 10 as previously described, the container engaging assembly 17 of the bogie is rolled along the support platform 14 to the operating end thereof which is adjacent the wheels 15 and opposite to the tie-down means 21. The position for unloading is shown in broken lines in FIG. 4 and in order to place the vertically movable frame portion in proper container gripping relation, the pawl 111 of the operating means 19 is moved out of operative position and the brake unit is released with the result that the movable frame unit will drop downwardly by reason of its own weight. As previously described, the side frames 42 are spaced sufficiently to receive therebetween the vertically movable frame portion and the endmost transverse beam 43 is spaced inwardly from the ends of the side frames 42. Thus the movable frame portion may drop down below the side frames 42 for supporting engagement of the bottom edge of a container on the ledge plate 85 thereof.

The top container locking hook members 95 are manipulated in the manner previously described to lockingly engage the top edge of a container 12. Now the container is adequately gripped by the device and may be raised in the container gripping assembly 17 by hand or power operation of the shaft 109 of the operating unit 19. The container is raised above the top surfaces of the side frames 42 of the support platform 14 and the entire container gripping assembly 17 is rolled rearwardly along the support platform toward the opposite end thereof. Movement of the container gripping assembly 17 along the support platform 14 is brought about by operation of the handle 59 of the drive chain arrangement. The chain 50 includes an L-shaped flange member 128 (see FIG. 8) projecting therefrom which is fixed to the end transverse beam 70 of the container engaging assembly 17. Thus this assembly will move back and forth along the support platform 14 as controlled by operation of the chain 50. Eventually the entire container is suspended over the support platform 14 and the pawl 111 may be again disengaged and by operation of the brake unit the container may be lowered into resting engagement on the top surfaces of the side frame members 42. In this regard the transverse spacing of the side frame members 42 is such that the container may be rested thereon.

The bogie 13 is now ready for movement along the dock 10 to transport the container thereon to any desired location. The tie-down arrangement 21 is released and the drawbar may be used for moving the bogie. The loading of a container onto a railway car or trailer chassis is accomplished by reversing the procedure described above.

Obviously certain modifications and variations of the invention as hereinbefore set forth may be made without departing from the spirit and scope thereof, and therefore only such limitations should be imposed as are indicated in the appended claims.

We claim:

1. In a container transfer means wherein a vertically movable container attachment means is mounted for movement longitudinally of a wheel-supported horizontal frame member to and from an end of said frame member for container loading and unloading and stabilized positioning centrally of said horizontal frame member for transporting thereof, the provision of spaced container engaging means on said attachment means comprising a lower container edge support and an upper container edge releasable clamping means, said clamping means including at least one container hook member which is adapted to hook over a vertically projecting portion of a container, depending lever means on which said hook member is pivotally mounted, said depending lever means being pivotally mounted on said container attachment means, the pivot point of said hook member being offset rearwardly from the pivot point of said lever means to provide for locking of said hook member in container clamping position and to provide for lifting of said hook member relative to said container attachment means upon pivoting of said lever means, and separate means attached to said hook member to pivot said hook member about its pivot point to move said hook member relative to said lever means out of clamping engagement with a container.

2. In a container transfer means having a vertically movable container attachment means, the provision of spaced container engaging means on said attachment means comprising a lower container edge support and an upper container edge releasable clamping means, said clamping means including at least one generally horizontally projecting container hook member which is adapted to hook over a vertically projecting portion of a container, depending lever means on which said hook member is pivotally mounted adjacent the rearmost portion of said hook member, said depending lever means being pivotally mounted on said container attachment means, the pivot point of said hook member being closely rearwardly offset from the pivot point of said lever means to provide for generally horizontal arcuate movement of said hook member relative to said container attachment means upon pivoting of said lever means to move said hook member into and out of clamping engagement with a container, and separate means attached to said hook member to pivot said hook member relative to said lever means in a generally vertical direction into and out of engagement with a container.

3. A container transfer bogie for use in loading and unloading containers, said bogie comprising a wheel-supported horizontal frame member, a vertical frame member mounted on said horizontal frame member through supporting rollers carried thereby, first drive means carried by said horizontal frame member at one end thereof and engaged with said vertical frame member to move the same longitudinally of said horizontal frame member toward and away from the opposite end thereof, said vertical frame member including a container gripping assembly mounted thereon for vertical movement relative thereto, second drive means carried by said vertical frame member and engaged with said container gripping assembly to vertically position the same, said second drive means being movable with said vertical frame member longitudinally of said horizontal frame member and including a releasable vertical height fixing means capable of holding said container gripping assembly and a container gripped thereby at a selected height and operable adjacent the base of said vertical frame member for lowering of a container onto said horizontal frame member, said container gripping assembly including a lower container bottom edge support and an upper container edge releasable clamping means, said clamping means including at least one generally horizontally projecting container hook member which is adapted to hook over a vertically projecting portion of a container, depending lever means on which said hook member is pivotally mounted adjacent the rearmost portion of said hook member, said depending lever means being pivotally mounted on said container gripping assembly, the pivot point of said hook member being closely rearwardly offset from the pivot point of said lever means to provide for generally horizontal arcuate movement of said hook member relative to said container gripping means upon pivoting of said lever means to move said hook member into and out of clamping engagement with a container, and separate means attached to said hook member to pivot said hook member relative to said lever means in a generally vertical direction into and out of engagement with a container, and transfer bogie releasable tie-down means carried by said one end of said horizontal frame member adapted for use to fix said one end against movement to stabilize said bogie during container loading and unloading.

References Cited by the Examiner

UNITED STATES PATENTS

| | | | |
|---|---|---|---|
| 1,101,598 | 6/14 | Weinke | 187—24 |
| 1,145,061 | 7/15 | Farrell | 188—82.7 |
| 1,922,635 | 8/33 | Post | 188—87.2 |
| 2,341,350 | 2/44 | Young | 214—75 |
| 2,667,985 | 2/54 | Woughter | 214—670 |
| 2,905,347 | 9/59 | Hopfeld | 214—654 |
| 2,973,876 | 3/61 | Voss | 214—654 |

FOREIGN PATENTS

| | | |
|---|---|---|
| 903,269 | 12/53 | Germany. |
| 854,323 | 11/60 | Great Britain. |
| 277,868 | 12/51 | Switzerland. |

HUGO O. SCHULZ, *Primary Examiner.*

ERNEST A. FALLER, Jr., *Examiner.*